H. GUILBEAULT
EGG-HOLDER.
No. 179,550. Patented July 4, 1876.
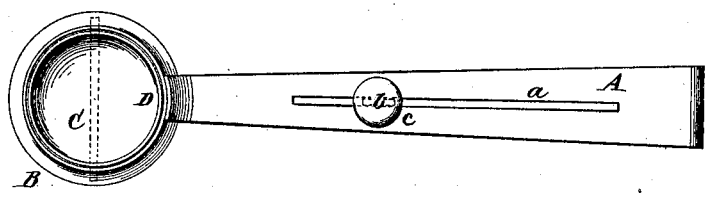
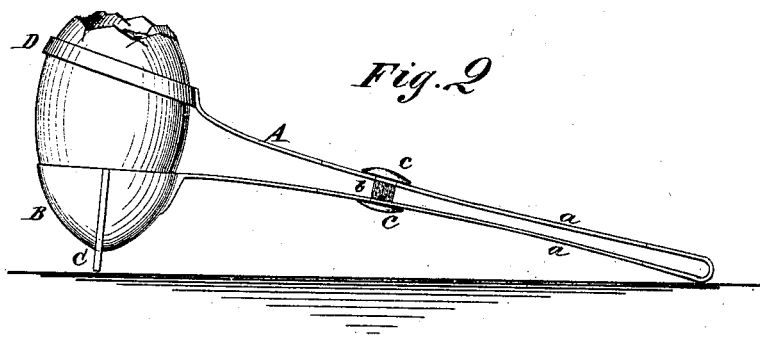

UNITED STATES PATENT OFFICE.

HENRI GUILBEAULT, OF NEW YORK, N. Y.

IMPROVEMENT IN EGG-HOLDERS.

Specification forming part of Letters Patent No. 179,550, dated July 4, 1876; application filed May 27, 1876.

*To all whom it may concern:*

Be it known that I, HENRI GUILBEAULT, of the city, county, and State of New York, have invented a new and Improved Egg-Holder, of which the following is a specification:

Figure 1 is a top view, and Fig. 2 is a side elevation.

Similar letters of reference indicate corresponding parts.

My invention consists in the combination of a cup of suitable form with a ring and spring-tongs, in such manner that an egg placed in the cup may be securely held by bringing the ring down upon the egg by sliding a double button, which connects the jaws of the tongs, through slots made in them for that purpose.

The object of the invention is to furnish a convenient device for holding an egg, while it is eaten from the shell.

Referring to the drawing, A is a pair of tongs, to the lower portion of which the cup B is attached. The cup B is provided with a foot-piece, C, which gives it a firm bearing when placed on the table. D is a ring, which is of such form as will encircle the end of an egg, leaving a portion of it projecting through. *a a* are slots cut longitudinally in the tongs. *b* is a stud, connecting the button *c c* through the slots *a a*.

The operation is as follows: The button *c* being at the extremity of the slot *a* remote from the cup B, the egg is placed in the cup B, and the button moved toward the cup until the egg is firmly embraced between the ring D and cup B. The portion of the egg which projects above the ring can then be broken without fear of breaking the other portion of the shell. The shell takes the place and answers the purpose of an egg-cup.

My invention is described as being made from sheet metal; but it may be advantageously made of wire by coiling the continuation of the lower portion into a cup-shaped receptacle for the egg, and at the end of the upper portion a ring may be formed; or the holder may be made from any other suitable material. The sliding button, which in this case is made use of to hold the tongs together, may be dispensed with, and a sliding ring placed upon the outside, which will answer the same purpose; or the tongs may be so made that the spring of the parts alone will be sufficient to hold the egg.

Having thus described my invention, I claim as new and desire to secure by Letters Patent—

1. The combination of the tongs A, cup B, and ring D, as shown and described.

2. The combination of the button *c*, tongs A, cup B, and ring D, as shown and described.

HENRI GUILBEAULT.

Witnesses:
T. B. MOSHER,
ALEX. F. ROBERTS.